United States Patent [19]

Signorelli

[11] Patent Number: 4,602,757
[45] Date of Patent: Jul. 29, 1986

[54] MINERAL BLOCK SUPPORT APPARATUS

[76] Inventor: Marc H. Signorelli, 225 S. Avenue 50, Apartment #1, Los Angeles, Calif. 90042

[21] Appl. No.: 554,689

[22] Filed: Nov. 23, 1983

[51] Int. Cl.⁴ ............................................. A47B 96/06
[52] U.S. Cl. .............................. 248/231.1; 248/309.2
[58] Field of Search ................. 248/231.1, 309.2, 360; 119/51 R, 18; 411/368, 378, 388, 389

[56] References Cited

U.S. PATENT DOCUMENTS

| | | | |
|---|---|---|---|
| 385,650 | 7/1888 | Wemple | 119/18 |
| 619,516 | 2/1899 | Tillotson | 411/389 X |
| 1,751,388 | 3/1930 | Bircher | 119/51 R |
| 2,142,825 | 1/1939 | Patten | 119/51 R |
| 2,709,985 | 6/1955 | Clauson | 119/51 R X |
| 3,208,701 | 9/1965 | Erickson | 248/309.2 X |
| 3,521,413 | 7/1970 | Scott et al. | 411/389 X |

FOREIGN PATENT DOCUMENTS 842365 7/1960 United Kingdom ................. 411/388

*Primary Examiner*—J. Franklin Foss
*Attorney, Agent, or Firm*—Pravel, Gambrell

[57] ABSTRACT

A mineral block support apparatus adapted particularly for use outside of a parrot cage, having a centrally disposed support post, on its first and uppermost end threaded to threadably engage the mineral block to be supported, and on its lowermost end threaded to threadably engage a first retainer nut and washer and a second retainer nut and washer, with at least a pair of cage bars rigidly engaged between the first and second pairs of washers and nuts.

1 Claim, 3 Drawing Figures

MINERAL BLOCK SUPPORT APPARATUS

BACKGROUND OF THE INVENTION

1. Field of the Invention

The apparatus of the present invention relates to feeding apparatuses for birds and the like. More particularly, the apparatus of the present invention relates to a mineral block support apparatus particularly adapted for use with a caged bird.

2. General Background

In the feeding and care of birds, particularly caged birds such as parrots or the like, various types of feeders are utilized for assuring that the bird is properly fed, watered, and supplied the nutrients necessary to maintain his health. Many of these entail the utilization of a feeder and/or water container adapted to the wall of the cage for allowing the parrot to feed and drink from the containers while he is perched within the cage. An additional necessary item, particularly for parrots, is a mineral block, which, for the most part, is a rigid block or mineral unit which the parrot obtains minerals from by scraping his beak along its surface, and at the same time keeping his beak sharp and trimmed for feeding purposes. The mineral block, as stated earlier, is an important feature in maintaining the parrot's health, and must, at all times, be reasonably accessible and present for use by the bird.

In the present state of the art, the overall support means for a mineral block inside or outside of a parrot cage is to simply attach flexible wires or bands extruding from the back portion of the block around several bars of the cage so as to support it along the side of the cage. However, this falls short in its reliability and longevity in view of the fact that the treatment that the block has to undergo when the parrot is utilizing the block oftentimes results in the block being torn away from the cage and is no longer useful.

Several patents have been granted which are the subject of feeding or mineral blocks, the most pertinent found in the art being as follows:

U.S. Pat. No. 3,119,372 issued to Gantz, entitled "Bird Cage Feeder Device" relates to an apparatus, as seen in FIGS. 1 through 3 of the patent, which is mountable between the bars of the bird cage, and provides a support base for the bird to be perched upon while feeding, from a cup or the like which would be placed in the opening between the bars.

U.S. Pat. No. 1,537,615 issued to McConnell entitled "Food Holder For Bird Cages", as seen from the Figures, also shows an apparatus which would support food for a bird. However, it simply provides a pair of pincers or the like for grasping the food while the bird is feeding.

U.S. Pat. No. 385,650 issued to Wemple entitled "Cuttle Bone and Food Holder For Bird Cages", as seen from the drawings, also includes an apparatus for clamping on to the food or mineral block during the feeding of the block.

U.S. Pat. No. 1,979,057 issued to Tomlinson entitled "Food Receptacle", as seen in the drawings, relates to a food receptacle for containing a mass of compressed food in the bird cage.

U.S. Pat. No. 1,886,015 issued to Henning, et al, entitled "Fixture For Holding Bird Food", as seen in the drawings, also relates to an apparatus which grasps the food between a pair of pincers and holds it in place while the bird is feeding.

U.S. Pat. No. 1,575,101 issued to Edwards entitled "Bird Stand" teaches the use of a standard stand which would accommodate the bird and the feeder as seen in the figures.

SUMMARY OF THE PRESENT INVENTION

The apparatus of the present invention would solve the problems shown in the present state of the art in a simple and straightforward manner. What is provided is a mineral block support apparatus adapted particularly for use outside of a parrot cage, having a centrally disposed support post, on its first and uppermost end threaded to threadably engage the mineral block to be supported, and on its lowermost end threaded to threadably engage a first retainer nut and washer and a second retainer nut and washer, with at least a pair of cage bars rigidly engaged between the first and second pairs of washers and nuts.

Therefore, it is an object of the present invention to provide an apparatus for supporting a mineral block for a parrot or the like;

It is a further object of the present invention to provide a support apparatus wherein the mineral block is threadably engaged thereto for easier replacement and removal;

It is still a further object of the present invention to provide a support apparatus which is rigidly attachable to the bars of the cage for continuous use by a parrot or the like;

In order to accomplish the above objects, it is a primary feature of the present invention to provide mineral block support apparatus having a single threadable support post for attaching both the block and the apparatus to the cage;

It is still a further feature of the present invention to provide a support apparatus for a mineral block having a means for supporting the mineral block exterior to the cage and permanently to the bars of the cage.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 3 is an overall view of the apparatus of the present invention attached to a parrot cage or the like.

DETAILED DESCRIPTION OF THE PREFERRED EMBODIMENT

Figure 3:
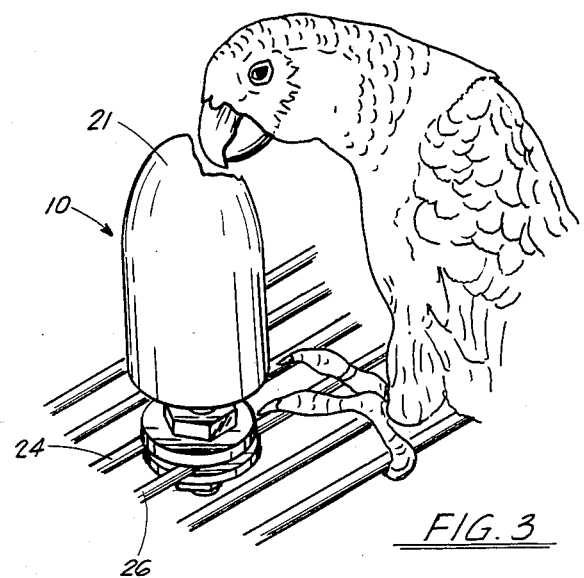
Figure 2:
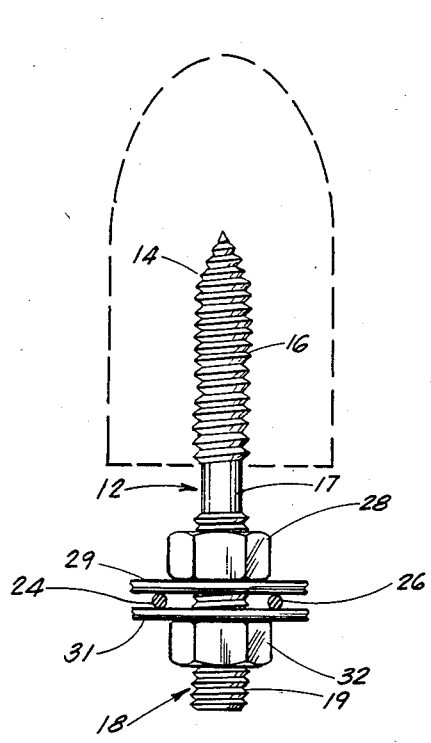
FIG. 2 is a side view of the preferred embodiment of the apparatus of the present invention illustrating the mineral block in phantom view thereto.
Figure 1:
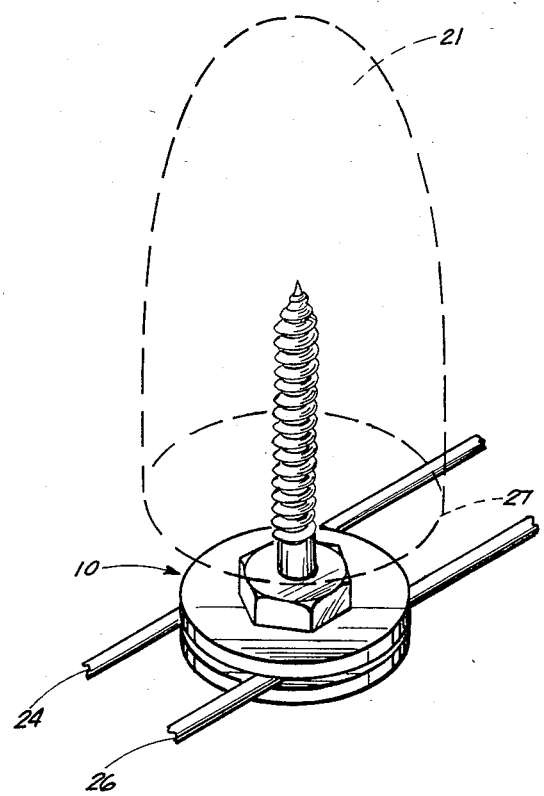
FIG. 1 is an overall perspective view of the preferred embodiment of the apparatus of the present invention illustrating, in phantom view, the mineral block attached thereto.

FIGS. 1 through 3 illustrate the preferred embodiment of the apparatus of the present invention by the numeral 10. Support apparatus 10, as seen particularly in FIGS. 1 and 2 in detail, provides a central support post 12 threaded on its upper end 14 with screw threads 16 substantially threaded throughout the upper half of post 12. The lower portion 18 of post 12 comprises threaded area 19, the lower portion 18 serving as a support means of the apparatus onto cage 20. There is intermediate area 17 then therebetween which is not threaded. As is further illustrated in FIGS. 1 and 2, a mineral block 21 shown in phantom view as it will be threadably engaged to upper portion 14 of post 12. In this manner, mineral block 21 is rigidly supported thereto permanently.

As further seen in FIGS. 1 and 2, the lower portion 18 serves as a means for rigidly attaching apparatus 10 to cage 20. In FIGS. 1 and 2, cage 20 is represented by a pair of cage bars 24 and 26, which run substantially parallel along, for example, the roof of the cage, and have space 27 therebetween. As seen in FIGS. 1 and 2, in mounting of apparatus 10, there would be first threadably mounted upper retainer nut 28, portion 18 of post 12, as seen in FIG. 2. Following the threadable mounting of nut 28, there is then provided upper washer base plate 29, which, as seen in the FIGURES, is substantially broader in width than the space 27 between bars 24 and 26, and therefore serves as an upper base plate resting upon bars 24 and 26, as seen particularly in side view of FIG. 2. Following the placement of washer 29, the apparatus is then placed resting on bars 24 and 26 and then there is fitted onto post 12, lower washer base plate 31, which is then held in place by threadably mounting lower nut 32. As seen in FIG. 2, by threadably tightening nut 32, the apparatus is held in place securely with cage bars 24 and 26 rigidly engaged between upper base plate 29 and lower base plate 31 by the pressure as nut 32 is tightened against the lower face of lower base plate 31.

As seen in the drawings, mineral block 21 in the preferred embodiment is threaded onto post 12 via threaded portion 14. However, mineral block 21 could conceivably be attached to post 12 in numerous ways, the main criterion being to have the block 21 immobily secured to post 12. When block 21 is depleted, the apparatus would simply be detached from cage 20 and replaced entirely.

In the placement of this apparatus, although the principal embodiment for placement, as seen in FIG. 1, is atop the roof portion of the cage in view of the fact that is where the parrot would be perched when outside the cage, the block, due to its unique mounting features, can be placed on the floor of the cage, on either side of the cage, or on the roof facing downward. Because of the unique means of fastening the apparatus onto the cage, these applications are feasible, and, therefore, lead to wider, more diverse use of the mounting apparatus.

Although this apparatus is particularly suited for mounting a mineral block, it could conceivably be utilized to threadably mount on the upper thread portion 16 of post 12, a water dish, food dish, or a combination of both, or any other item which one would normally utilize in furnishing the parrot cage.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for mounting a mineral block in a bird cage, comprising:
a central mounting post, the upper portion of the the post adapted for threadably accommodating a mineral block thereonto, so that complete access is available to the outer surface of the mineral block and the lower portion of the post providing means for threadably securing the apparatus to the walls of the bird cage, the securing means including:
   (i) an upper retainer nut threadably mounted onto the lower portion of the post;
   (ii) a lower retainer nut threadably mounted below the upper retainer nut;
   (iii) first and second base plates located between the upper and lower nuts, so that at least a pair of bars of the cage on which the apparatus is to be secured between the faces of the upper and lower mounting plates, with the mounting plates firmly adhering to the bars through the threadably engagement of the upper and lower nuts against the respective upper and lower faces of the mounting plates.

* * * * *